United States Patent
Fawks et al.

(10) Patent No.: US 8,644,443 B2
(45) Date of Patent: Feb. 4, 2014

(54) GAMMA THERMOMETER AXIAL APPARATUS AND METHOD FOR MONITORING REACTOR CORE IN NUCLEAR POWER PLANT

(75) Inventors: James Edward Fawks, Wilmington, NC (US); Gabriel Francisco Cuevas Vivas, Wilmington, NC (US)

(73) Assignee: GE-Hitachi Nuclear Energy Americas LLC, Wilmington, NC (US)

(*) Notice: Subject to any disclaimer, the term of this patent is extended or adjusted under 35 U.S.C. 154(b) by 0 days.

(21) Appl. No.: 13/465,203

(22) Filed: May 7, 2012

(65) Prior Publication Data

US 2012/0307955 A1  Dec. 6, 2012

Related U.S. Application Data

(62) Division of application No. 11/944,971, filed on Nov. 26, 2007, now Pat. No. 8,175,210.

(51) Int. Cl.
*G21C 17/112* (2006.01)
*G21C 17/00* (2006.01)

(52) U.S. Cl.
USPC .......................... 376/247; 376/245; 376/254

(58) Field of Classification Search
USPC .................. 376/245, 254, 255, 247
See application file for complete search history.

(56) References Cited

U.S. PATENT DOCUMENTS

| | | | |
|---|---|---|---|
| 5,015,434 A | | 5/1991 | Wimpee et al. |
| 5,225,149 A | * | 7/1993 | Banda ........................... 376/255 |
| 5,490,184 A | * | 2/1996 | Heibel ........................... 376/254 |
| 6,236,698 B1 | * | 5/2001 | Hirukawa et al. ............. 376/255 |
| 6,408,041 B2 | * | 6/2002 | Hirukawa ...................... 376/254 |
| 6,430,247 B1 | * | 8/2002 | Mourlevat et al. ............ 376/254 |
| 6,456,681 B1 | | 9/2002 | Goto et al. |
| 6,477,219 B2 | | 11/2002 | Hirukawa et al. |
| 6,542,565 B2 | * | 4/2003 | Ruddy et al. .................. 376/254 |
| 8,175,210 B2 | * | 5/2012 | Fawks et al. .................. 376/254 |
| 2001/0026603 A1 | | 10/2001 | Hirukawa et al. |
| 2003/0128793 A1 | | 7/2003 | Karino et al. |
| 2007/0237282 A1 | | 10/2007 | Rahnema et al. |

FOREIGN PATENT DOCUMENTS

| | | |
|---|---|---|
| JP | S49-035794 A | 4/1974 |
| JP | 6289182 | 10/1994 |
| JP | 2000346980 | 12/2000 |
| JP | 2001042083 | 2/2001 |

OTHER PUBLICATIONS

International Search Report for EOA 08169347 (May 26, 2009).

(Continued)

*Primary Examiner* — Bernarr Gregory
(74) *Attorney, Agent, or Firm* — Nixon & Vanderhye P.C.

(57) ABSTRACT

A pair of linear arrays of gamma thermometer (GT) sensors arranged in a nuclear reactor core including: a first linear array of GT sensors, wherein the GT sensors are arranged asymmetrically along a length of the first linear array; a second linear array of GT sensors, wherein the GT sensors are arranged asymmetrically along the second linear array and wherein the second linear array of GT sensors is asymmetrical with respect to the first linear array of GT sensors, and the first linear array positioned in the reactor core at a first core location and the second instrument housing positioned at a second core location, wherein a line of symmetry of the core extends through a center of the core and the first core location is the same horizontal distance from the line of symmetry as the second core location.

13 Claims, 7 Drawing Sheets

(56) References Cited

OTHER PUBLICATIONS

R. Raghavan et al., "Application of the Gamma Thermometer as BWR Fixed In-Core Calibration System", 10 pages (published prior to 2007).

Demaziere, C., "Development of a Noise-Based Method for the Determination of the Moderator Temperature Coefficient of Reactivity (MTC) in Pressurized Water Reactors (PWRs)", Thesis for the degree of Doctor of Philosophy, 2002, pp. 1-232.

Office Action from corresponding JP Applications No. 2008-297763, dated Jun. 25, 2013.

* cited by examiner

GAMMA THERMOMETER AXIAL APPARATUS AND METHOD FOR MONITORING REACTOR CORE IN NUCLEAR POWER PLANT

CROSS RELATED APPLICATION

This application is a divisional of application Ser. No. 11/944,971 filed Nov. 26, 2007, (U.S. Pat. No. 8,175,210) the entire content of which application is hereby incorporated by reference.

BACKGROUND OF THE INVENTION

This invention relates to monitoring the reactor core in a nuclear power plant and, particularly, to arranging gamma thermometers in the core of a boiling water nuclear reactors (BWR).

A typical BWR nuclear power plant includes nuclear instruments that monitor the condition of the reactor core. The signals generated by these instruments are used to maintain the reactor core within allowable operating conditions. The instrument signals may be processed by a core monitor software that determines the 3-Dimensional (3D) nodal powers and the 2-Dimensional (2D) bundle flows. The 3D nodal powers and 2D bundle flows may then be used to determine thermal margins within the reactor core. The operators may use the determined thermal margins to make adjustments to the core operating conditions so not to exceed the allowable operating conditions. Further, the 3D nodal powers and 2D bundle flows may be used by plant operators to confirm that the reactor core is operating within allowable operating conditions.

The instruments for a typical BWR nuclear reactor include a Transverse In-core Probe (TIP) system and a Local Power Range Monitor (LPRM) and/or Start-Up Range Neutron Monitor (SRNM) systems. The available types of TIP instruments comprise instruments to measure neutron thermal flux and instruments to measure gamma flux. LPRM instruments generally measure neutron thermal flux.

TIP and LPRM instruments are arranged in a core to take axial measurements at fixed radial locations in the core. Conventionally, the TIPs are mechanically moved in and out of the core to calibrate the LPRMs and, particularly, to calibrate individual detectors in each LPRM. During the calibration process, a TIP is positioned next to a detector of a LPRM and the LPRM gain electronics are adjusted to cause the LPRM detector to generate an output signal equivalent to an output signal from the adjacent TIP. In addition, the TIPs may provide processed output signals indicating the neutron thermal flux and gamma flux at various elevations in the reactor core, such as at elevations at six inch (15 centimeters) intervals. The flux measurements taken at various elevations of the core provide axial information regarding the power shape in the core at non-LPRM core locations.

Maintaining and operating the TIP mechanical system to raise and lower the TIPs is expensive. Gamma Thermometers (GT) sensors have been used instead of TIPs. Unlike the TIPs that were moved in and out of the core, the GT sensors are positioned at fixed axial locations in the core. Similar to TIPs, the GT sensors are used to calibrate the LPRMs. Because the GT sensors are at fixed axial locations, the expense of a mechanical movement system to raise and lower the TIPs has been eliminated for the stationary GT sensors.

In a conventional application, seven or more GT sensors are arranged as a linear array, such as on a vertical string. These vertical arrays of seven GT sensors are positioned at various fixed elevations in the reactor core. The fixed elevations for the GT sensors are manufacturing determined and correspond to fixed axial positions on the string supporting the GT sensors.

Fabricating the GT sensors on the strings is problematic due to the narrow tolerances for axial placement of the GT sensors in each string. Each GT of a string must be positioned precisely on the string to be positioned in the core at the elevations to which they are assigned. The GT sensors in each vertical string are each positioned within narrow vertical tolerances to assure that each GT sensor is positioned at its assigned axial position, e.g., adjacent a LPRM when the GT sensor is placed in the core. The narrow vertical tolerances for the GT strings are necessary so that the LPRMs can be accurately calibrated. Each string of GT sensors is permanently fixed in the core after the array is properly positioned and vertically aligned with the LPRMs.

To expand the vertical tolerances for the GT strings would, in combination with the inherent uncertainty in any nuclear measurement systems, e.g., the LPRMs, create uncertainties in the determination of the operating conditions of a reactor core. An increase in the uncertainties in the determination of core operating conditions will likely lead to a narrowing of the reactor core operating limits as the operating margins are increased to compensate for the increased uncertainties. The increase margins can result in additional reactor fuel cost as the acceptable operating conditions are narrowed.

The narrow axial tolerances applied to the strings of GT sensors are problematic with respect to the manufacturing of these arrays. The tolerances reduce the number of GT sensors that can be accurately positioned on a GT string to, for example, seven GT sensors. The limited number of GT sensors that can be manufactured on each string reduces the amount of core information that can be sensed by the GT sensors.

The amount of information regarding the axial power shape of a core that can be sensed by a GT string is dependent on the number of GT sensors vertically arranged on the string. Each GT sensor collects data at a particular axial position on the string, which corresponds to an elevation in the core. Limiting the number of GT sensors on each GT string limits the core elevations for which there is data from GT sensors.

The amount of information regarding the axial power shape increases as the number of GT sensors on a string increases. For example, seven GT sensors on a string provides less information regarding the axial power shape at various core elevations than would twenty GT sensors on a string. Increasing the information that is sensed by the GT sensors regarding the axial power shape in a core reduces the uncertainty of that power shape. A reduction in the uncertainty of the power shape allows for a corresponding reduction in the margins applied to the core operation limits. Reducing the uncertainty margins, allows for the core to be operated at conditions that are safe and more efficient respect to fuel consumption.

It is conventional for the axial locations of each GT/sensor in a string to be specified prior to the manufacture of the string. In addition, each GT string for a core is manufactured such that the GT sensors are arranged at the same axial locations on each string. Thus, GT sensors are arranged at the same core elevations for every axial location of the GT arrays. Because these GT elevation locations are fixed, the GT elevations are typically hard coded into the core monitoring software. The core monitoring software does not allow for GT sensors to be arranged at core elevations outside the assign axial positions for each sensor and the narrow tolerances predefined for the GT sensors.

There is a long felt need for an arrangement of GT sensors that can be readily manufactured and provide an increased amount of information regarding the axial power shape of a core.

BRIEF DESCRIPTION OF THE INVENTION

A method has been developed for collecting data regarding the operating condition of a nuclear reactor core including: positioning a first linear array of gamma thermometer (GT) sensors in a first instrument housing, wherein the GT sensors are arranged asymmetrically along the first linear array; positioning a second linear array of GT sensors in a second instrument housing, wherein the GT sensors are arranged asymmetrically along the second linear array and wherein the second linear array of GT sensors is asymmetrical with respect to the first linear array of GT sensors; positioning the first instrument housing in the reactor core at a first core location and positioning the second instrument housing at a second core location symmetrical with respect to the first core location; collecting core condition data from at least one of the GT sensors in the first linear array of GT sensors, and applying the collected core condition data as data collected from the second linear array.

A pair of linear arrays of gamma thermometer (GT) sensors have been developed that are arranged in a nuclear reactor core, the pair comprising: a first linear array of GT sensors, wherein the GT sensors are arranged asymmetrically along a length of the first linear array; a second linear array of GT sensors, wherein the GT sensors are arranged asymmetrically along the second linear array and wherein the second linear array of GT sensors is asymmetrical with respect to the first linear array of GT sensors; the first linear array positioned in the reactor core at a first core location and the second instrument housing positioned at a second core location symmetrical with respect to the first core location.

A method has been developed to collect and present data from gamma thermometer (GT) sensors indicative of a nuclear reactor core, the method comprising: forming a plurality linear GT arrays of GT sensors, wherein an axial positions of the GT sensors in each array is not predetermined prior to forming the array; determining the axial position of each of a plurality of GT sensors arranged in each of the linear GT arrays; storing the axial positions for each GT sensors in a data file associated with the linear GT array; loading the data file for each of the linear GT arrays into a core monitor software positioning; for each of the linear GT arrays, the core monitor software determines the elevation in the core of each of the GT sensors based on the axial positions in the data file; positioning the linear GT arrays in the core; collect data regarding an operating condition of the core from the GT sensors for each linear GT array, and the core monitoring software using the collected data to generate a presentation of a core condition at various core elevations. The method may further include: positioning each of the linear GT arrays in a separate instrument tube; positioning detectors for a Local Power Range Monitor (LPRM) in each of the instrument tubes; for each instrument tube, identifying one of the GT sensors of the array adjacent to each of the detectors, and calibrating each of the detectors by either using the identified adjacent GT sensor or a non-adjacent GT sensor that is closest to the detector.

DETAILED DESCRIPTION OF THE INVENTION

Figure 1:
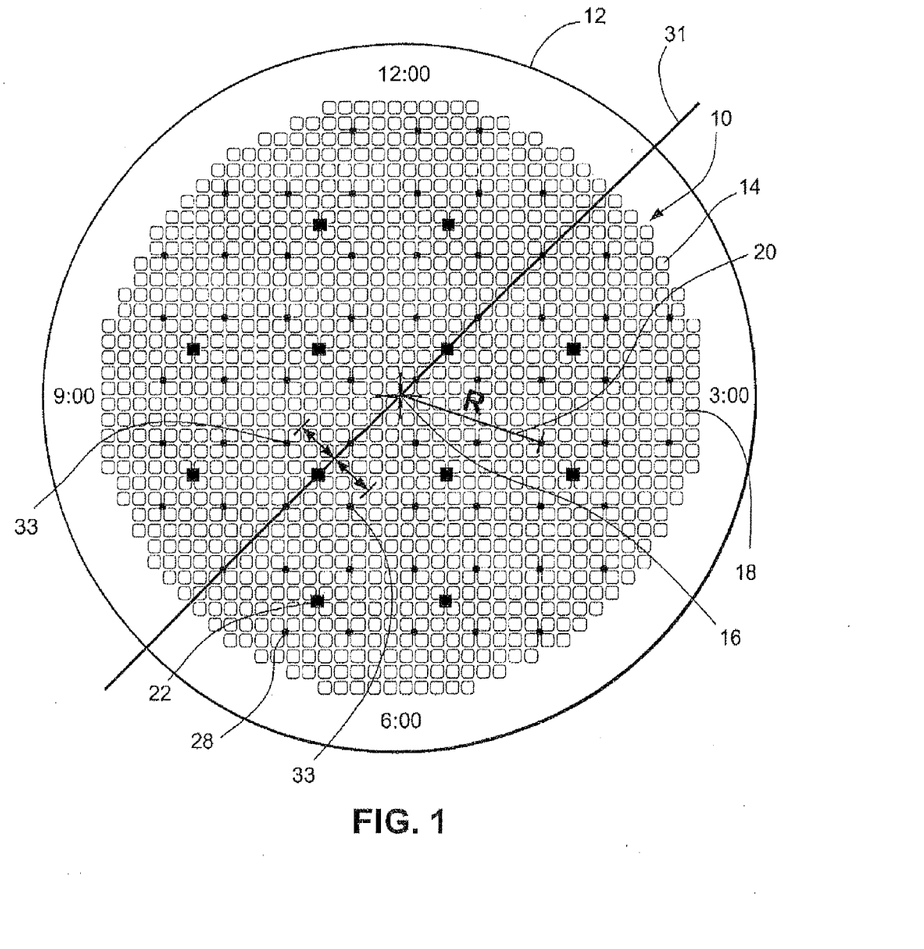
FIG. 1 is a schematic diagram of a reactor core shown in a top down view.

FIG. 1 is a schematic illustration of a reactor core 10 contained in a reactor vessel 12 of a BWR. The core 10 comprises, for example, hundreds of fuel bundles 14 (identified in FIG. 1 by white squares with black borders). Each fuel bundle 14 may include an array of fuel rods, water rods and channels. Control rod blades (not shown) are inserting between groups of bundles, e.g., between 2×2 arrays of bundles. Water in the reactor vessel 12 surrounds the rods. Heat generated by nuclear reactions is transferred from the rods to the water circulating through the core, boiling some of the water. The heat generated in the core is carefully controlled to maintain safe and efficient reactor operations in the core.

The vessel 12 is typically a cylindrical water filled chamber sealed within the BWR. The fuel bundles are submerged in the water in the vessel 12, wherein the vessel may have a water filled depth of approximately 12 feet (4 meters) or more. FIG. 1 is a top down view of a vessel that shows the two-dimensional (2D) array of hundreds of fuel bundles 14 arranged in the core. The 2D array of fuel bundles may be arranged in rows and columns and have a generally circular perimeter. The center 16 of the array of fuel bundles is referred to as the radial center of the array. Fuel bundles 14 near the center 16 of the array tend to experience more severe operating conditions than do fuel bundles near the outer periphery 18 of the array. Fuel bundles at a common radii 20 in the array will typically experience similar core operating conditions.

Various instruments are positioned in the core vessel to monitor conditions in the core. These instruments may include flux measuring devices that measure neutron and gamma flux in the core and provide data indicative of the power of the reactor. For example, startup range neutron monitor (SRNM) channels 22 (black squares in FIG. 1) and local power range monitor (LPRM) systems 28 (black circles). The SRNM channels measure low power ranges of neutron flux at their respective channel location in the core. The core may have other power monitors, such as local power range monitor (LPRM) channels that measure neutron and gamma flux in the core. In addition, TIP or GT instruments may be arranged side-by-side with the LPRMs and SRNMs.

The instruments 22 and 28 are arranged at predetermined positions in the core, such at predetermined radial positions with respect to the center 16 of the core. The instruments may be arranged symmetrically in the core such, as is shown in FIG. 1. Each type of instrument, e.g., LPRM and SRNM, may be arranged symmetrically in the core. The monitoring instruments, e.g., LPRM, SRNM, TIPs and GT sensors, measure neutron and/or gamma flux at various radial positions and elevations in the core.

The core has a line of symmetry 31 extending through the center 16 of the core 10. The core is symmetrical about the line of symmetry. The line of symmetry is typically a line extending at 45 degrees from the 1:30 position to the 7:30 position on the core, as shown in FIG. 1. In particular, the conditions in the arrangement and condition of the core mirrored on opposite sides of the line of symmetry. With respect to the instruments 33 at the same (common) distance from the line of symmetry and along a line perpendicular to the line of symmetry receive a uniform amount of flux from the core, provided that they are at the same elevation in the core. By way of example, instruments 33, e.g., a pair of GT string, are the same distance from the line of symmetry 31 along a line perpendicular to the line of symmetry. GT sensors in this pair of GT strings at the same elevation in the core will receive the same amount of flux from the core.

Figure 2:
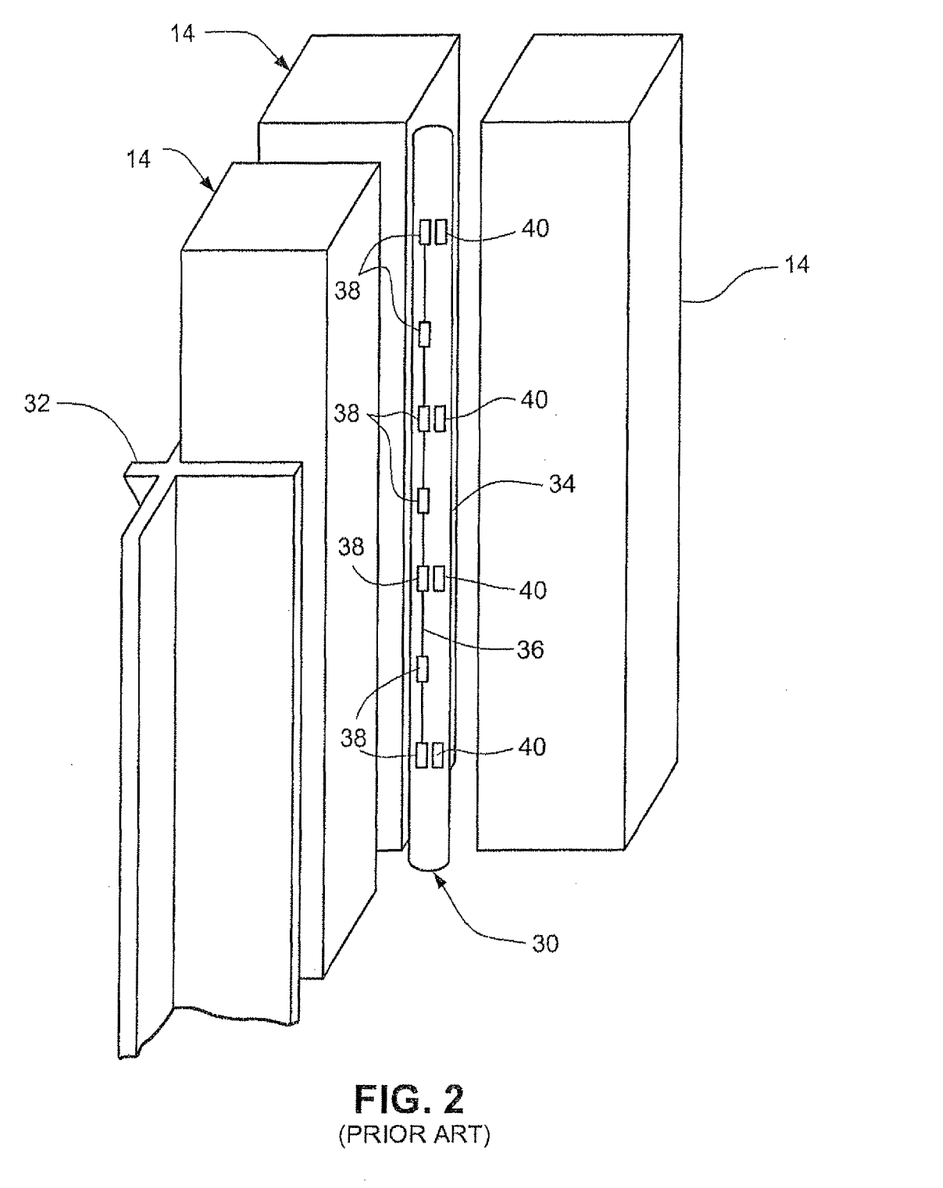
FIG. 2 is a perspective view of an instrument tube arranged between fuel bundles, and showing the tube in a cut-away view to expose sensors in the tube.

FIG. 2 shows a conventional arrangement of fuel bundles 14, surrounding a flux measuring instrument 30, and adjacent a control rod blade 32. The flux measuring instrument 30 may be housed in a sealed hollow instrument tube 34 containing a linear GT string array 36 of individual sensors, including Gamma Thermometers (GT sensors) 38 and neutron flux detectors 40 for a LPRM or SRNM.

The instruments 30 are typically arranged between a group of four adjacent fuel bundles. Each instrument 30 extends substantially the length of the fuel bundles, preferably at least the length of the active portion of the fuel rods in the bundle. The instruments are at the same elevation in the core as the fuel bundles and are preferably fixed in the core during core nuclear operation.

The instruments 30 are arranged in a core to collect data regarding neutron and gamma flux levels at various radial positions in the core. At each radial position in the core, the instruments collect flux level data at various elevations in the core. Within each instrument tube 34, individual measuring sensors 38, 40 are arranged at various axial locations along the length of the tube. When the tube is in the core, these axial locations in the sensors correspond to various elevations in the core. The sensors provide data on flux levels for each of the axial locations of the sensors in the instrument tube 34 and at the core elevations corresponding to the axial locations.

In each instrument tube 34, the sensors may include, for example, GT sensors, LPRMs and SRNMs. The sensors may also include TIPs, that are arranged adjacent the instrument tube. However, TIPs are typically not fixed in the core, and are moved mechanically in and out of the core by the operators of the plant. TIPs are preferably not used because they require complex and expensive mechanical conveyors to move the TIPs within the core. A benefit of the GT sensors over the TIPs is that GT sensors may be fixed in a tube housing 34 with the LPRMs or SRNMs.

Each GT sensor 38 generates output signals providing data of gamma flux levels at the radial location on the string for the sensor which corresponds to an elevation in the core. The GT sensors in each tube housing 34 may be used to calibrate the LPRMs 40 in the same tube. To calibrate the LPRMs, the string 36 of GT sensors is positioned in the tube such that a GT sensor is axially aligned next to a LPRM in the tube. To calibrate a LPRM, the output signal of the LPRM is adjusted to match the output signal of the GT sensor adjacent to the LPRM. The output signal of the LPRM may be adjusted by changing the gain of the electronics in the LPRM that processes the signal from the LPRM. In addition, the GT sensors may be used to acquire flux data from the core.

The arrangement of GT sensors 38 in the tube 34 shown in FIG. 2 are arranged at predetermined locations along the GT string 36. The GT string and its GT sensors are conventional. These predetermined locations are specified prior to the manufacturing process for the GT string. The string is manufactured such that the GT sensors 38 are positioned at the predetermined axial locations along the string. Typically, a relatively small number of GT sensors, e.g., seven, are positioned on a string at specified axial locations corresponding to the locations of the sensors for the LPRM. The predetermined axial string positions for the GT sensors are subject to narrow tolerances to ensure that the GT sensors are positioned adjacent the LPRM sensors. Positioning the GT sensors at the same axial position as the LPRM sensors is needed to accurately calibrate each LPRM sensor with an adjacent GT sensor. The greater the axial distance between the GT sensor and LPRM sensor, the greater the uncertainty in the calibration of the LPRM sensor.

Due to restrictions of the manufacturing process for strings of GT and the tight axial tolerances for positioning GT sensors on the string, conventional strings about seven GT sensors is the maximum number of sensors that can be economically manufactured using conventional string manufacturing processes. In addition to calibrating the LPRM sensors, flux data from the GT sensors may be used to determine the power shape of the core. The limited number of GT sensors reduces the flux data that can be acquired at different core elevations by the GT sensors. The resolution of the determined power shape of the core is dependent, in part, on the number of GT sensors on each string. With only seven GT sensors on each string, the resolution of the power shape (as determined by the GT sensors) in an axial direction of the core, e.g., at different core elevations, is relatively coarse.

The resolution of the determined power shape of the core may be increased by increasing the number of GT sensors on each GT string. A new GT string structure and method for fabricating the strings has been developed that eliminates the prefabrication axial positioning restriction on GT sensors in a string. By eliminating this positioning restriction, a relatively large number, e.g., sixteen or greater, of GT sensors may be arranged in a string.

Figure 3:
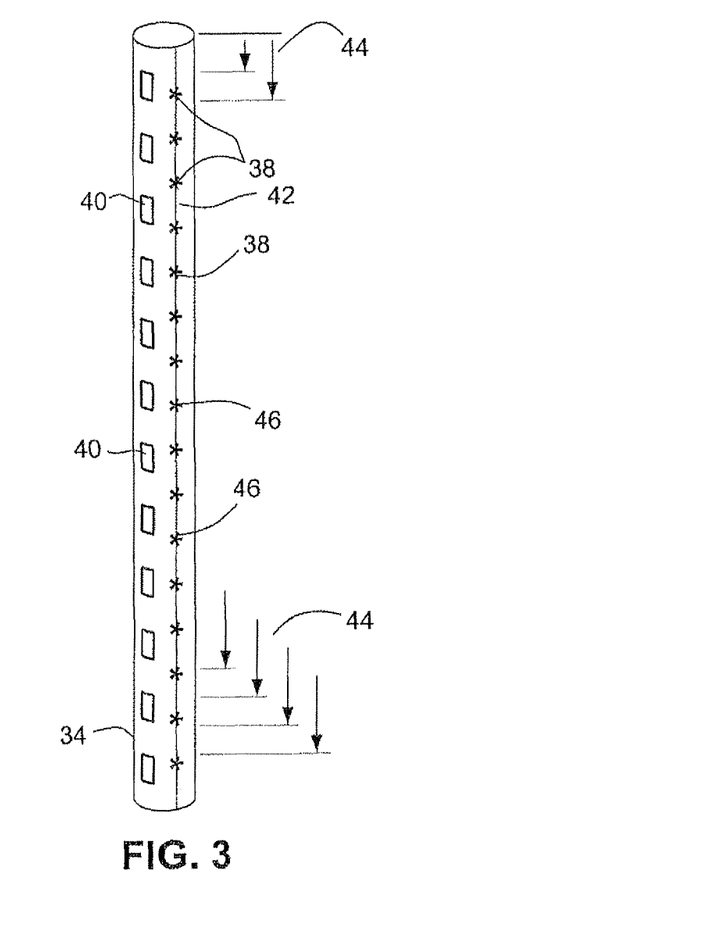
FIG. 3 is a schematic diagram of an instrument tube housing sensors for an LPRM and a GT string with a relatively large number of GT sensors.

FIG. 3 is a schematic diagram of an instrument tube housing sensors 34 for an LPRM and a GT string 42 with a relatively large number of GT sensors 38. The tube housing, LPRM and GT sensors may be conventional. The fabrication process for the GT string may also be conventional, with the exception that the fabrication process is not limited to placing the GT sensors at predetermined axial positions on the string. The fabrication process may include positioning a relatively large number of GT sensors, e.g., sixteen or more, in a metallic rod of, for example, having a diameter of two inches (5 cm) and length of one foot (30 cm).

Figure 4:
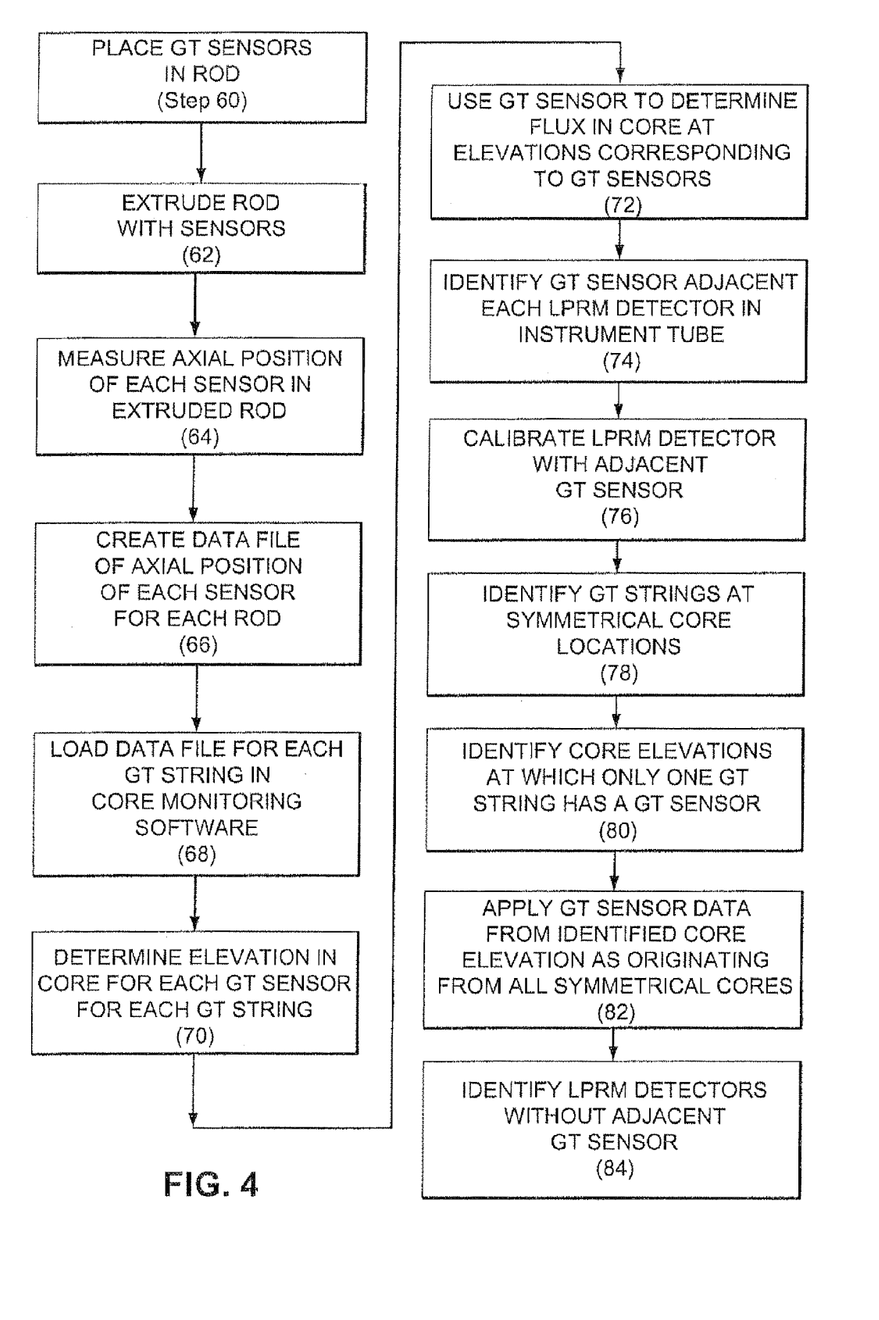
FIG. 4 is a flow chart of a fabrication method and registration method for the GT strings.

FIG. 4 is a flow chart of a fabrication method and registration method for the GT strings. In step 60, the number of GT sensors placed in the rod may be as many as can fit in the pre-extruded rod. In step 62, the rod with the GT sensors is stretched through a conventional extrusion process to a length of, for example, 15 feet (4.5 m) and a diameter of 0.25 inches (6 mm). During the extrusion process, the GT sensors are somewhat arbitrarily dispersed along the axial length of the rod, as is shown in the stretched rod 42 shown in FIG. 3.

After the extrusion process, the axial position 44 of each GT sensor 38 in the string is measured using conventional GT sensor detection instruments and methods, in step 64. The axial position 44 of each GT sensor is determined to a high degree of accuracy, e.g., to within 1 to 5 mm. The axial position of each GT sensor is registered and stored for future reference when using the particular GT string, in step 66. The axial position of each GT sensor is stored in a computer data file that is associated with the corresponding GT string.

The data file of the axial positions of each GT sensor in a GT string is loaded into a computer system for the reactor core that includes a core monitoring software program, in step 68. This program may be a conventional system for monitoring reactor core operations, analyzing data from instruments and sensors monitoring the core and generating maps showing the power shape of the core in three dimensions (3D), including in radial directions and elevations in the core. Conventional core monitoring programs have hard coded axial positions as to known GT sensor positions in each GT string. For present purposes, the program is modified to accept an input file of the GT sensor positions for each of the GT strings in instrument tubes arranged in the core. In particular, the software program reads the data file of the axial positions of GT sensor for each GT string and determines the elevation in the core for each GT sensor, in step 70. The software associates the elevation of each GT sensor with the radial position of the GT string in the core (and optionally the angle of the radii associated with the sensor). Knowing the elevation and radial position of each GT sensor, the core monitoring software uses the data collected by the sensors to generate a power shape map of the core, in step 72.

Figure 5:
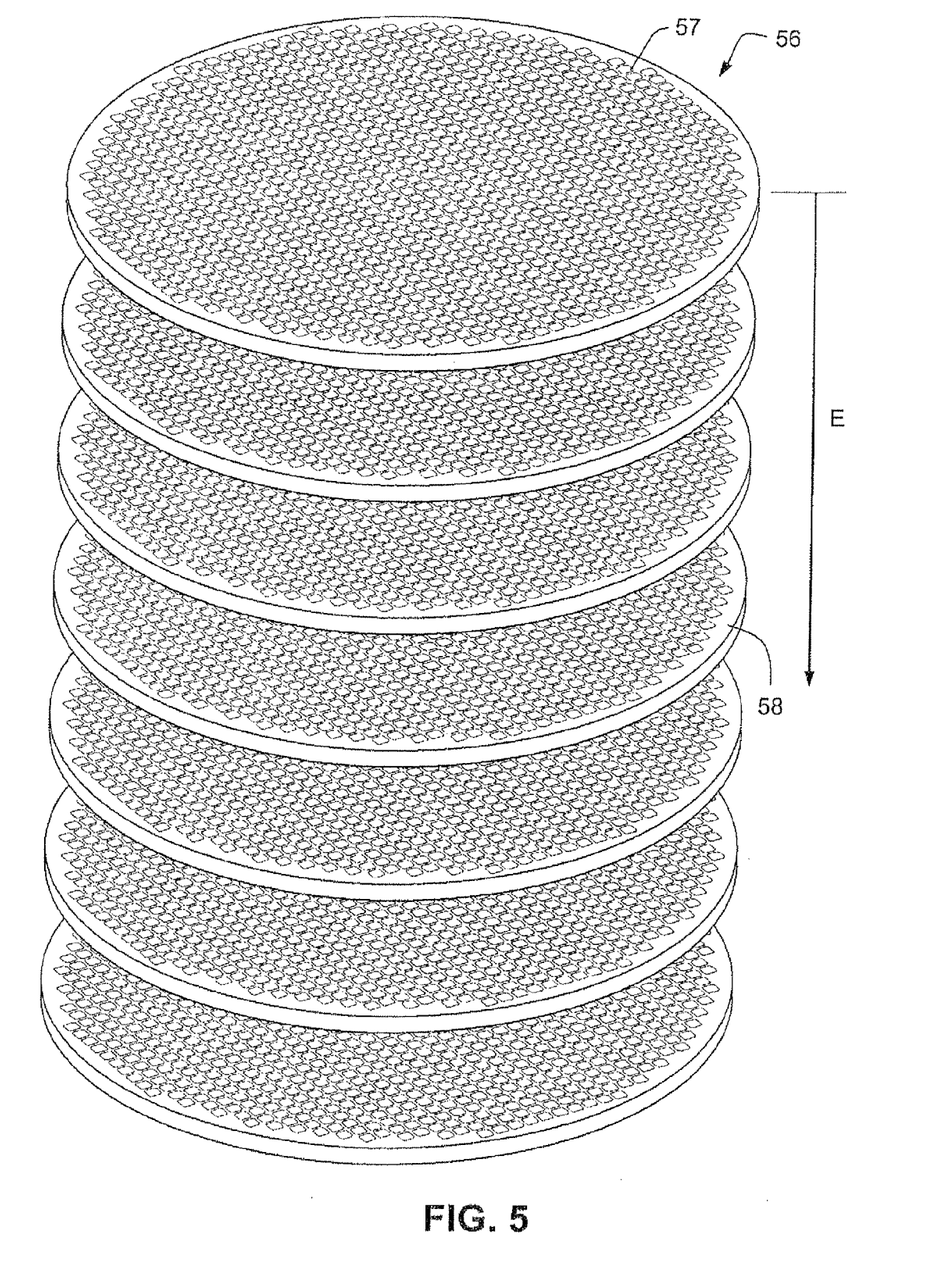
FIG. 5 shows an exemplary three dimensional (3D) map of a power map generated by data collected from the GT sensors.

An exemplary 3D power shape graph 55 is shown in FIG. 5. The 3D power shape graph presents radial power distributions at different axial elevations (E) in the core corresponding to the elevation of the GT sensors on the GT strings. Core locations 57 may be color coded to represent the core power at each location. For example, a core location 57 shown in red may indicate a higher power level than another core location shown in blue. The core locations are shown in the 3D graph 55 at various core elevations 53 and at different core locations on each elevation.

In addition, the manufacturer of the instrument tube 34 or the core monitoring software identifies the GT sensor 46 in a string adjacent each detector of the LPRM 40 in the tube, in step 74. The identified GT sensor adjacent each detector is used to calibrate the detector, in step 76. Because of the relatively large number of GT sensors arranged in the string, there will be a GT sensor adjacent each LPRM detector. The GT sensors adjacent each LPRM detector can be determined knowing the axial location of both the GT sensors and the LPRM detectors.

If the adjacent GT sensor fails or is unavailable, the closest GT sensor to the detector will be used to provide the detector calibration. Using a GT sensor that is further away from the detector, increases the uncertainty of the calibration.

Having the manufacture of the GT strings determine the as-built axial locations of the GT sensors after the string is fabricated allows for the removal of the requirement that a particular GT sensor be positioned at a specific axial location in the string. Without this requirement, many more GT sensors, e.g., two to three times more GT sensors, can be placed in a GT string than when the requirement is imposed. By increasing the number of GT sensors in a string increases the elevations in the core at which GT sensors collect flux data regarding the power of the core.

Figure 6:
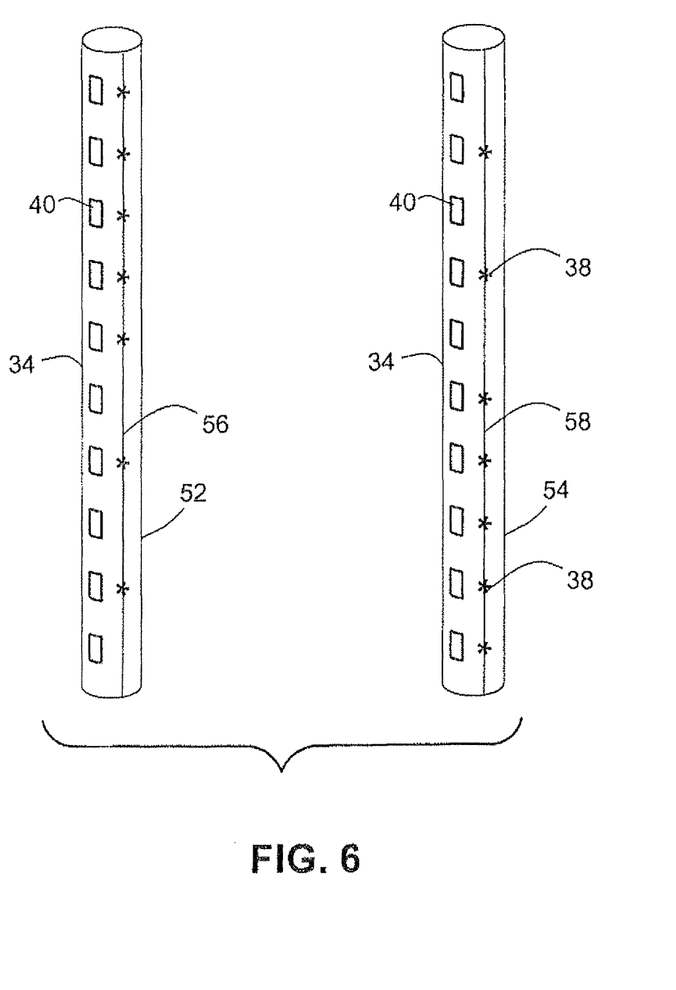
FIG. 6 is a schematic diagram of a pair of instrument tubes at symmetrical positions in the core and having GT strings with GT sensors arranged asymmetrically on the string.

FIG. 6 is a schematic diagram of a pair of instrument tubes 52, 54 at symmetrical positions (see instruments 33 in FIG. 1) in the core and having GT strings 56, 58 with GT sensors arranged asymmetrically on the string. The pair of instrument tubes 52, 54 that are arranged at a common distance from the line of symmetry 31 (FIG. 1). These tubes 52, 54 both have a GT string 56, 58 of GT sensors and a LPRM 40. The GT strings 56, 58 detect the same core conditions, e.g., gamma flux, because they are at symmetric positions in the core. Symmetric positions in the core include positions at the same core elevation, and same distance from the line of symmetry along a line core perpendicular to the line of symmetry. For symmetrically situated GT strings, it can be safely assumed that the flux data collected by the GT sensors on the strings should be the same, except for elevation variations of the GT sensors.

The asymmetrical arrangement of GT sensors in the strings may be intentional and based on axial locations of GT sensors determined before the fabrication of the GT string. Because of the predetermined axial locations of the GT sensors, the number of sensors that can be arranged in the string is limited to, for example seven GT sensors. The GT string 56 on the left side of FIG. 6 has more GT sensors towards the top half of the string than in the bottom half. Similarly, the GT string on the right side of FIG. 6 has more GT sensors in the bottom half of the string than in the top half. Another form of asymmetric locations is to have the same number of GT sensors on two strings at symmetric and the axial locations of GT sensors on each string be different.

The asymmetrical axial arrangement of GT sensors in each string results in at least some of the GT sensors in one string 56 being at elevations in the core at which there is no corresponding GT sensor in the other string 58. At those core elevations, only one GT string is acquiring data regarding the flux in the core. In addition, there are fewer GT sensors than detectors 40 for the LPRM. Calibrating the detectors without an associated GT sensor is problematic. The LPRM detector axial positions are identical for both instrument tubes 56, 58. The symmetrically positioned GT strings 56, 58, have GT sensors arranged such that collectively for both strings there is a GT sensor at each of the LPRM detector axial positions in the instrument tube. The core monitor software identifies GT sensors that are directly adjacent a LPRM detector, e.g., at the same elevation, or the GT sensors closest to the LPRM detector. If only one GT sensor is identified (for example a GT sensor is at the same elevation ad the detector), the detector is calibrated by adjusting the electronics associated with the LPRM detector until the detector outputs the same signal level as being sensed by the identified GT sensor. If multiple GT sensors are identified as being proximate a LPRM detector, the core monitor software may interpolate the GT sensor signals, such as by a weighted average based on the axial distance from each GT sensor to the same elevation of the detector. The weighted average of GT sensors is used by the software as a reference signal to which is matched the output of the LPRM detector by adjusting the electronics for the LPRM detector.

The core monitor software infers that GT strings at symmetric locations, e.g., at the same distance from the radial symmetry axis, experience the same core conditions, including core flux. Based on this inference, the core monitor software applies the GT sensor data from one string (the "originating string") as data that is collected a both the originating string and data collected at another string at a symmetrical core location with the originating string, unless the other string has a GT sensor at the same core location. Similarly, a LPRM detector 40 that does not have a directly adjacent GT sensor may be calibrated using the data from the GT sensor at the same or close elevation as the detector and in an instrument tube at a symmetrical core location.

Figure 7:
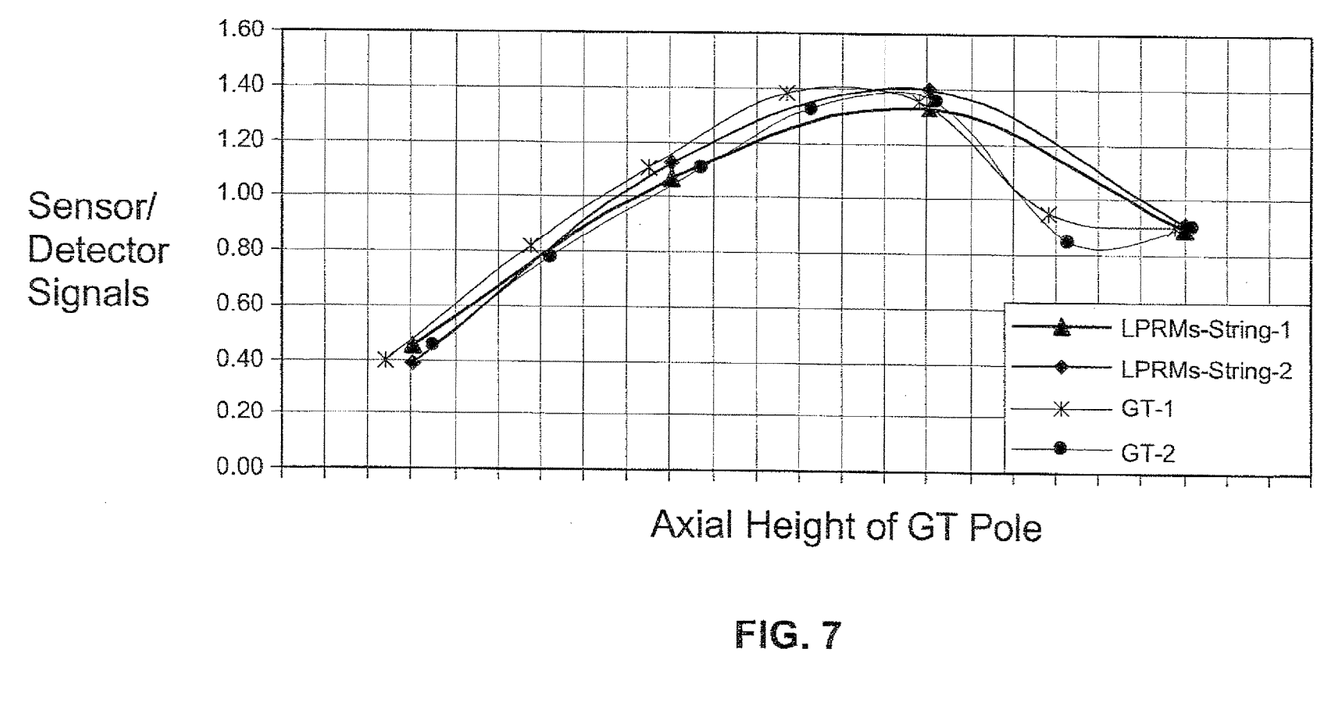
FIG. 7 is a chart showing an example of expected instrumentation signals (such as from LPRM, GT sensors) at various axial elevations and demonstrates the similarities of two linear arrays of instruments at symmetric core locations.

FIG. 7 is a chart showing the strong correlation of data from GT sensors (GT-1, GT-2) and data from detectors (LPRMs-string-1, LPRM-string-2), where the sensors and detectors are at almost the same axial locations in an instrument tube, and the tubes are symmetrically arranged in the core. In particular, a first instrument tube with GT sensors (GT-1 and detectors (LPRMs-string-1) is symmetrically arranged in the core with a second tube with GT sensors (GT-2) and detectors (LPRMs-string-2). The GT sensors at the same axial height in both tubes have substantially the same expected data signal output. Similarly, the detectors (LPRMs) in both tubes and at the same axial height have the same expected detector signal output, which is equal to the GT sensor signals for the corresponding elevation. Because of the similarity of signals, a GT sensor in one tube can be used to calibrate a detector in another tube, provided the detector is at the same elevation as the GT sensor and the tube with the detector is symmetrically arranged in the core with the tube having the GT sensor.

The core monitor software identifies GT strings in the core at symmetrical core locations, in step 78 of FIG. 4. For symmetrical GT strings, the controller identifies core elevations at which one but not both of the symmetrical strings have a GT sensor, in step 80. For the one GT sensor at each of the identified core elevations, apply the sensor data as originating from both symmetrical strings in analyzing the condition of the core, such as in generating a power shape of the core. To calibrate the LPRM detectors, the core monitor software identifies detectors 40 that do not have an adjacent GT sensor in the same instrument tube, in step 84. To calibrate each of the identified detectors 40, use the data from the GT sensor at the same axial position as the detector but from an instrument tube symmetrically positioned in the core.

The two schemes disclosed herein for increasing the effective number of GT sensors monitoring a core reduce the uncertainty in the nuclear measurement system relative to the current economical optimum of about only seven GT sensors per GT string. The first scheme increases the number of GT sensors in each string, but has a risk of not positioning a GT sensor directly adjacent a LPRM detector for calibration purposes. The second scheme uses a reduced number (albeit a conventional number) of GT sensors but relies on an asymmetrical arrangement of sensors and substitution of sensor data between symmetrically positioned instrument tubes in the core. Both schemes collect data at more core elevations than can be achieved by known methods of fabricating GT strings. Reducing the uncertainty in the measurement system favorably impacts the operating limits for the core and can result in better core performance, lower fuel costs and the elimination of complex TIPs.

The monitoring software uses the asymmetrical arrangement of sensors to substitution sensor data between symmetrically positioned instrument tubes in the core, the monitoring and to calibrate the detectors, e.g., LPRM detectors in different tubes. This capability allows the software to calibrate a greater number of LPRM detectors than the number of fixed GT sensors. The calibration can be conducted frequently to ensure that the data generated by the detectors is accurately calibrated. Further, detectors that are not adjacent GT sensors may be calibrated by using data from GT sensors that are symmetrically positioned in another instrument tube. While the substitutability of sensor data from symmetrical locations in a core is conventional, this disclosure presents an application of the substitutability of sensor data that was previously unknown to the best of the knowledge of the inventors.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A pair of linear arrays of gamma thermometer (GT) sensors arranged in a nuclear reactor core, the pair comprising:
    a first linear array of GT sensors, wherein the GT sensors are arranged asymmetrically along a length of the first linear array;
    a second linear array of GT sensors, wherein the GT sensors are arranged asymmetrically along the second linear array and wherein the second linear array of GT sensors is asymmetrical with respect to the first linear array of GT sensors, and
    the first linear array positioned in the reactor core at a first core location and the second instrument housing positioned at a second core location, wherein a line of symmetry of the core extends through a center of the core and the first core location is the same horizontal distance from the line of symmetry as the second core location and wherein the horizontal distance for the first core location is along a line perpendicular to the line of symmetry and the horizontal distance for the second core location is along another line perpendicular to the line of symmetry.

2. The pair of linear arrays as in claim 1 wherein a majority of the GT sensors in the second linear array are in a lower half of the second linear array and a majority of the GT sensors in the first linear array are in an upper half of the first linear array.

3. The pair as in claim 1 wherein the first core location and second core location are at opposites sides of the line of symmetry.

4. A method to collect and present data from gamma thermometer (GT) sensors indicative of a nuclear reactor core, the method comprising:
    forming a plurality linear GT arrays of GT sensors, wherein an axial positions of the GT sensors in each array is not predetermined prior to forming the array;
    determining the axial position of each of a plurality of GT sensors arranged in each of the linear GT arrays;
    storing the axial positions for each GT sensors in a data file associated with the linear GT array;
    accessing the data file for each of the linear GT arrays using a core monitor software;
    for each of the linear GT arrays, a determination is made using the core monitor software of the elevation in the core of each of the GT sensors based on the axial positions in the data file;
    positioning the linear GT arrays in the core;
    collect data regarding an operating condition of the core from the GT sensors for each linear GT array, and
    using the collected data to generate a presentation of a core condition at various core elevations.

5. The method of claim 4 wherein the presentation is a 3-Dimensional (3D) graph of core power at various core nodal positions corresponding to the linear GT arrays.

6. The method of claim 4 further comprising:
    positioning each of the linear GT arrays in a separate instrument tube;
    positioning detectors for a Local Power Range Monitor (LPRM) in each of the instrument tubes;
    for each instrument tube, identifying a one of the GT sensors of the array adjacent each of the detectors, and
    calibrating each of the detectors by interpolating signals from GT sensors proximate to each of the detectors.

7. The method of claim 4 wherein forming the plurality linear GT arrays includes placing the GT sensors in a metallic rod and extruding the rod with the GT sensors in the rod.

8. The method of claim 4 wherein positioning the linear GT arrays includes arranging a pair of the GT arrays at core locations at a same distance from a line of symmetry extending through a core axis, wherein the distance is along lines perpendicular to the line of symmetry.

9. The method of claim 8 further comprising applying GT data collected from one array of the pair of GT arrays as having been collected at the other array of the pair of GT arrays.

10. The method of claim 8 wherein at least two of the GT arrays are positioned at a common distance from a line of symmetry extending through an axis of the core, wherein the common distance is along lines perpendicular to the line of symmetry.

11. The method of claim 10 wherein the GT arrays include a first GT array and a second GT array, and the first GT array is at a first core location and the second GT array is at a second core location, wherein a line of symmetry of the core extends through a center of the core and the first core location is the same horizontal distance from the line of symmetry as the second core location and wherein the horizontal distance for the first core location is along a line perpendicular to the line of symmetry and the horizontal distance for the second core location is along another line perpendicular to the line of symmetry, and the method further comprises using data collected from the first GT array as being representative of a condition at the second core location.

12. The method of claim 4 wherein each of the linear GT arrays has at least four GT sensors, and at least one GT sensor is in close proximity to a LPRM.

13. The method of claim 4 wherein the GT sensors in each linear GT array are asymmetrically arranged along an axis of the array.

* * * * *